US007933925B2

(12) United States Patent
Sreedhar

(10) Patent No.: US 7,933,925 B2
(45) Date of Patent: Apr. 26, 2011

(54) SYSTEM AND METHOD FOR ROLE BASED ANALYSIS AND ACCESS CONTROL

(75) Inventor: Vugranam Chakravarthy Sreedhar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 11/446,104

(22) Filed: Jun. 1, 2006

(65) Prior Publication Data

US 2007/0282841 A1 Dec. 6, 2007

(51) Int. Cl.
*G06F 7/00* (2006.01)

(52) U.S. Cl. ........................................ 707/786; 707/797

(58) Field of Classification Search .............. 707/9, 690, 707/694, 781, 797, 999.009
See application file for complete search history.

(56) References Cited

U.S. PATENT DOCUMENTS

| | | | | |
|---|---|---|---|---|
| 5,347,578 | A * | 9/1994 | Duxbury | 707/9 |
| 5,581,691 | A * | 12/1996 | Hsu et al. | 714/15 |
| 5,634,127 | A * | 5/1997 | Cloud et al. | 719/313 |
| 5,911,143 | A * | 6/1999 | Deinhart et al. | 707/103 R |
| 6,088,679 | A * | 7/2000 | Barkley | 705/8 |
| 6,938,186 | B2 * | 8/2005 | Das et al. | 714/38 |
| 6,950,825 | B2 * | 9/2005 | Chang et al. | 1/1 |
| 7,350,237 | B2 * | 3/2008 | Vogel et al. | 726/27 |
| 2005/0262132 | A1 * | 11/2005 | Morita et al. | 707/102 |
| 2006/0059567 | A1 * | 3/2006 | Bird et al. | 726/27 |
| 2007/0074188 | A1 * | 3/2007 | Huang et al. | 717/141 |

OTHER PUBLICATIONS

Patrick Lam, Viktor Kuncak, Martin Rinard, Generalized Typestate Checking Using Set Interfaces and Pluggable Analysis, Mar. 2004, vol. 39(3), 46-55.*

Viktor Kuncak, Patrick Lam, Martin Rinard, Role Analysis, Jan. 2002,ACM, 16-32.*

Patrick Lam, Viktor Kuncak, and Martin Rinard; "Generalized Typestate Checking Using Set Interfaces and Pluggable Analyses"; SIGPLAN Notices; 2004.*

Eric Armstrong et al., The J2EE 1.4 Tutorial Sun Java System Application Server Platform Edition 8.1 2005Q2 UR2; Jun. 7, 2005; pp. 1-1500.

A. Banerjee et al., "Representation Independence, Confinement and Access Control [extended abstract and appendices]"; POPL 02: Proceedings of the 29th ACM SIGPLAN-SIGACT Symposium on Princeples of Programming Languages, NY NY 2002; pp. 1-15.

A. Banerjee et al., "Secure Information Flow and Pointer Confinement in a Java-like Language"; CSFW '02: Proceedings of the 15th IEEE Computer Security Foundations Workshop; Washington, DC; 2002; pp. 1-15.

A. Banerjee et al., "Stack-Based Access Control and Secure Information Flow", J. Funct. Program, 15(2): 2005; pp. 131-177.

D. E. Bell et al., "Secure Computer System: Unified Exposition and Multics Interpretation" Technical Report MTR-2997, MITRE Corporation, Mar. 1976; pp. 1-129.

Jong-Deok Choi et al., "Escape Analysis for Java", Proceedings of ACM SIGPLAN Conference on Object-Oriented Programming Systems, Languages and Applications; NY NY; 1999; pp. 1-19.

(Continued)

*Primary Examiner* — Luke S. Wassum
*Assistant Examiner* — Mohammed R Uddin
(74) *Attorney, Agent, or Firm* — Tutunjian & Bitetto, PC; Preston J. Young, Esq.

(57) ABSTRACT

A system and method for program access control includes, for a typestate, providing typestate properties and assigning a role to the typestate in a program in accordance with the typestate properties. Access to operations is limited for the typestate in the program based on the role assigned to the typestate and an access permission level.

7 Claims, 11 Drawing Sheets

OTHER PUBLICATIONS

R. Deline et al., "Typestates for Objects" 18th European Conf. on Object-Oriented Programming,; 2004; pp. 1-26.
David Ferraiolo et al., "Role-Based Access Control", 15th NIST-NCC Nat'l Computer Security Conference, Baltimore MD, Oct. 1992; pp. 1-11.
David Ferraiolo et al., "Proposed NIST Standard for Role-Based Access Control", ACM Trans. Inf. Syst. Secur. 4(3); 2001; pp. 224-274.
Frederic Vivien et al., "Incrementalized Pointer and Escape Analysis", PLDI '01: Proceedings of the ACM SIGPLAN 2001 COnference on Programming Language Design and Implementation; ACM Press; NY, NY 2001; 12 pages.
David Grove et al., "A Framework for Call Graph Construction Algorithms" ACM Trans. on Programming Languages and Systesm, vol. 23, No. 6, Nov. 2001; pp. 685-746.
Michael Hind, "Pointer Analysis: Haven't We Solved This Problem Yet?" PASTE '01: Proceedings of the 2001 ACM SIGPLAN-SIGSOFT Workshop on Program Analysis for Software Tools and Engineering, NY NY, ACM; 2001; 8 pages.
Patrick Lam et al., "Generalized Typestate Checking Using Set Interfaces and Pluggable Analyses", SIGPLAN Not., 39 (3); 2004; pp. 1-10.
Ninghui Li et al., "Security Analysis in Role-Based Access Control"., SACMAT '04; Proceeding of the ninth ACM Symposium on Access Control Models and Technologies, NY NY, 2004; ACM Press; pp. 126-135.
V. Benjamin Livshits et al., "Finding Security Vulnerabilities in Java Applications with Static Analysis", Proceeding of the 14th USENIX Security Symposium, 2005; 16 pages.
Gleb Naumovich et al., "Static Analysis of Role-Based Access Control in J2EE Applications", Workshop on Testing, Analysis and Verification of Web Services, NY NY 2004; ACM Press; 10 pages.
S.L. Osborn et al., "Configuring Role-Based Access Control to Enforce Mandatory and Discretionary Access Control Policies", ACM Transactions on Information and System Security, vol. 3, No. 2, May 2000; pp. 85-106.
Young Gil Park et al., "Escape Analysis on Lists", PLDI '92; Proceedings of the ACM SIGPLAN 1992 Conference on Programming Language Design and Implementation; NY NY, ACM Press; 1992; 12 pages.
Marco Pistoia et al., "Interprocedural Analysis for Privileged Code Placement and Tainted Variable Detection", 19th European Conference on Object-Oriented Programming, 2005; 25 pages.
Marco Pistoia et al., Static Evaluation of Role-Based Access Control Policies in Distributed Component-Based Systems: Technologies Report RC23836 (W0411-166); IBM TJ Watson Research Center, IBM Research Division, Yorktown, NY; Nov. 2004; pp. 1-18.
Santhosh Kumaran et al., "Adaptive Business Objects: A New Component Model for Business Integration"; 7th International Conference on Enterprise Information Systems (ICEIS 2005) May 24-28, Miami, FL; 14 pages.
Bruno Blanchet et al., Escape Analysis for Object-Oriented Languages: Application to Java:, OOPSLA '99; Proceedings of the 14th ACM SIGPLAN Conference on Object-oriented programming systems, languages and applications; 1999; pp. 20-34.
Ravi S. Sandhu et al., "Role-Based Access Control Models", IEEE Computer 29(2); 1996; pp. 38-47.
Torben Amtoft et al., "A Logic for Information Flow in Object-Oriented Programs", ACM 2006; pp.1-12.
David Harel, "Statecharts: A Visual Formalism for Complex Systems", Science of Computer Programming 8(3); 1987; pp. 231-274.
Robert E. Strom et al., "Typestate: A Programming Language Concept for Enhancing Software Reliability", IEEE; vol. SE-12, No. 1 Jan. 1986; pp. 157-171.

* cited by examiner

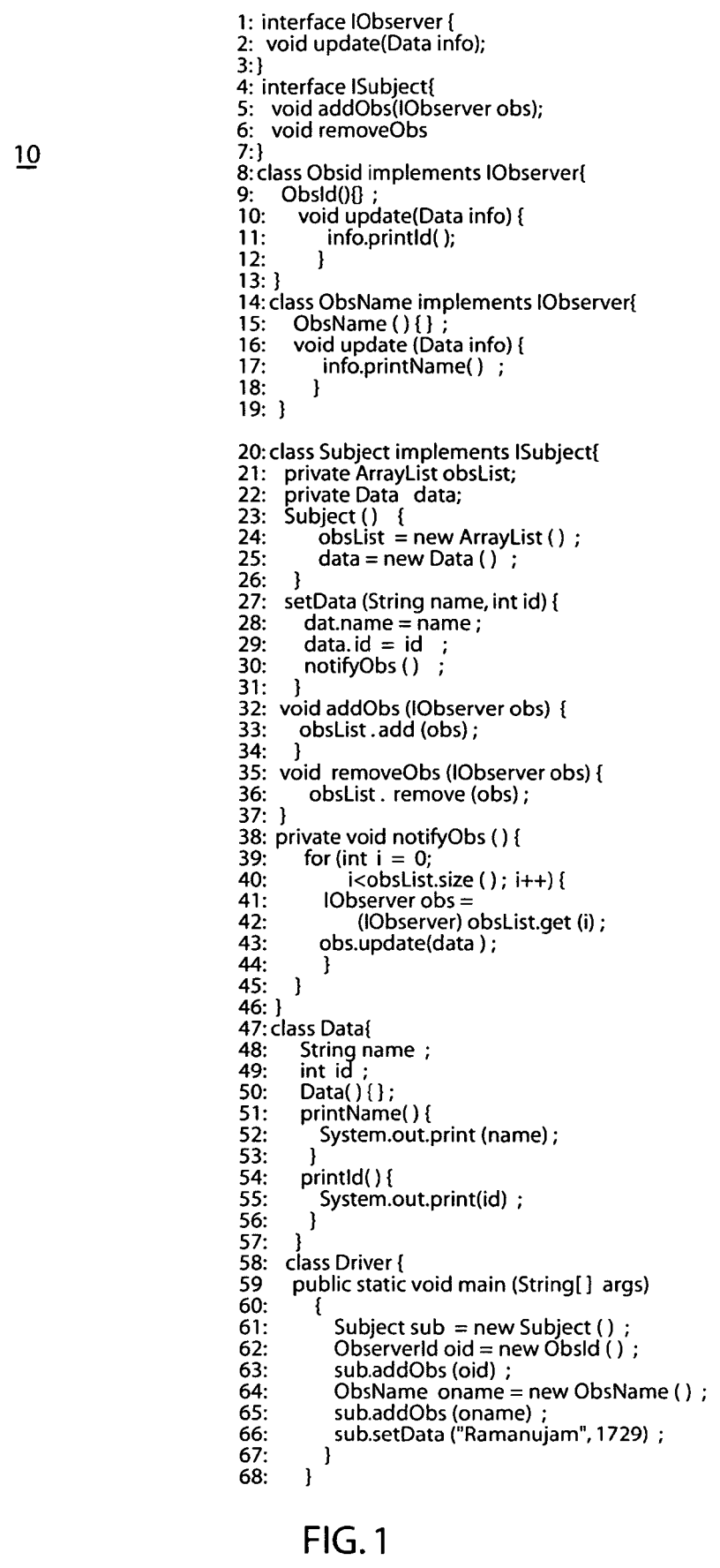

10

```
interface IObserver {
 void update(Data info);
}
interface ISubject{
  void addObs(IObserver obs);
  void removeObs
}
class Obsid implements IObserver{
   ObsId(){} ;
     void update(Data info) {
         info.printId( );
        }
}
class ObsName implements IObserver{
   ObsName ( ) { } ;
   void update (Data info) {
       info.printName( )  ;
      }
}

class Subject implements ISubject{
  private ArrayList obsList;
  private Data  data;
  Subject ( )  {
      obsList  = new ArrayList ( )  ;
      data = new Data ( )  ;
  }
  setData (String name, int id) {
     dat.name = name ;
     data. id  =  id   ;
     notifyObs ( )   ;
  }
 void addObs (IObserver obs)  {
    obsList . add (obs) ;
  }
 void  removeObs (IObserver obs) {
     obsList .  remove (obs) ;
}
private void notifyObs ( ) {
   for (int  i  =  0;
          i<obsList.size ( ) ;  i++) {
      IObserver obs =
           (IObserver) obsList.get (i) ;
      obs.update(data ) ;
      }
  }
}
class Data{
   String name  ;
   int id  ;
   Data( ) { } ;
   printName( ) {
      System.out.print (name) ;
    }
   printId( ) {
      System.out.print(id)  ;
    }
  }
 class Driver {
  public static void main (String[ ]  args)
     {
        Subject sub  = new Subject ( )  ;
        ObserverId oid = new ObsId ( )  ;
        sub.addObs (oid)  ;
        ObsName  oname = new ObsName ( )  ;
        sub.addObs (oname)  ;
        sub.setData ("Ramanujam", 1729)  ;
      }
  }
```

FIG. 1

```
<method - permission>
    <role - name> Notifier </role - name>
        <method>
            <class - name> Subject </class - name>
            <method - name> setData </method - name>
        </method>
    <role - name> Manager </role - name>
        <method>
            <class-name> Subject </class - name>
            <method - name> addObs </method - name>
            <method - name> removeObs </method - name>
        </method>
    <role - name> Director </role - name>
        <method>
            <class - name> Subject </class - name>
            <method - name> * </method - name>
        </method>
            <role-name> DisplayId </role - name>
        <method>
            <class - name> ObsId </class - name>
            <method - name> * </method - name>
        </method>
    <role - name> DisplayName </role - name>
        <method>
            <class - name> ObsName </class - name>
            <method - name> * </method - name>
        </method>
<method - permission>
```

FIG. 2

SYSTEM AND METHOD FOR ROLE BASED ANALYSIS AND ACCESS CONTROL

BACKGROUND

1. Technical Field

The present invention relates to access control of programs and more particularly to systems and methods for role based security and role based security analysis.

2. Description of the Related Art

In Java 2 Enterprise Edition™ (J2EE™) and MICROSOFT™ XML Web Services platform (.NET™) roles are assigned to methods using external configuration files, called the deployment descriptors. The security model of J2EE™ and .NET™ are quite similar, and for simplicity examples herein will employ the Java™ programming language. J2EE™ and the Java™ programming language are trademarks of SUN MICROSYSTEMS™. .NET™ is a trademark of the MICROSOFT CORPORATION™.

Assigning roles to methods, although conceptually simple, in practice is quite complicated. For instance, in order for a deployer to assign a role r to a method m, the deployer must understand the set of roles R that are assigned to each method n that can be invoked directly or indirectly from m, and that r has to be "consistently" assigned with respect R. Understanding such role consistency is a non-trivial task. Also, in J2EE™ roles are defined with respect to method access and not data access. Therefore, in order to protect sensitive data, one has to encode data access control using method access control. This can lead to interesting and subtle access control problems when accessing sensitive data, including information leakage through data flow from one method to another.

SUMMARY

A system and method for program access control includes, for a typestate, providing typestate properties and assigning a role to the typestate in a program in accordance with the typestate properties. Access to operations is limited for the typestate in the program based on the role assigned to the typestate and an access permission level.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1 is an illustrative observer pattern program used as an example for demonstrating present principles;

FIG. 2 illustratively shows code for role definitions in accordance with an illustrative embodiment;

DETAILED DESCRIPTION OF PREFERRED EMBODIMENTS

Figure 3:
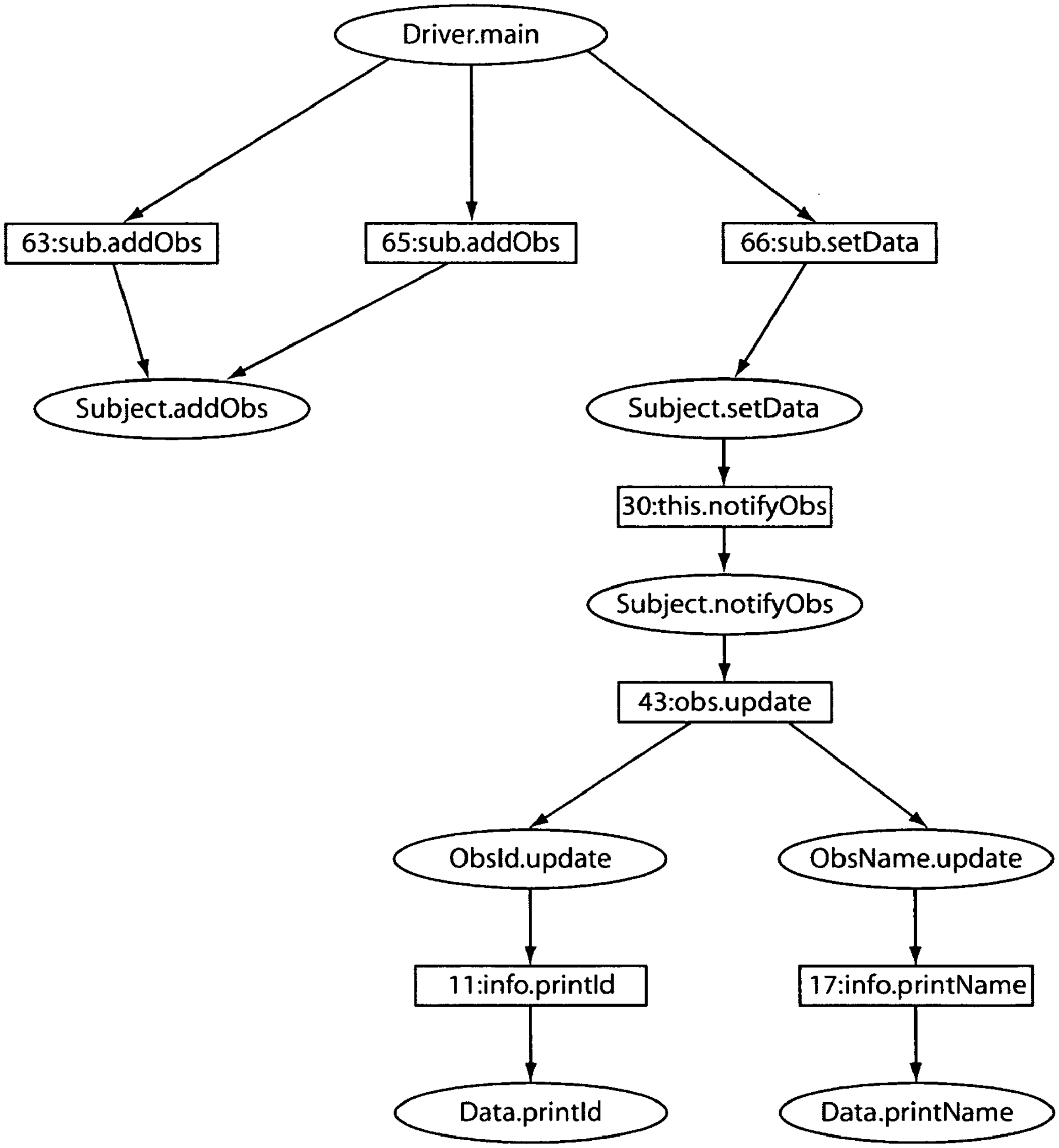
FIG. 3 is a call graph for the program depicted in FIG. 1.

A data-centric security system and method are presented, which include at least the following two concepts. 1) Role Analysis: A simple interprocedural static analysis for detecting security problems when objects are accessed by multiple methods that do not have compatible or consistent assignment of roles is provided. Then, a notion of an object "escaping" a role is presented, and a simple interprocedural static analysis for computing the set of objects that may escape a role is provided.

2) Consistency-Based Security and Role Typestates: J2EE™ method-based role assignment is extended to consistency-based role assignment. One focus includes assigning roles to typestates rather than methods.

Role Based Access Control (RBAC) is a popular mechanism for defining and managing access to security sensitive resources. In RBAC, security properties, such as access control to sensitive resources, are controlled through roles. Users are assigned one or more roles, who then inherit the security properties associated with the roles. RBAC provides greater security by preventing users from obtaining inconsistent or incompatible security properties. J2EE™ and .NET™ support RBAC by restricting the roles to method access. In J2EE™, a role r is simply a named set of methods M, and whenever a principal P is assigned the role r the principal can then access any of the methods in M. In practice only application entry methods are assigned roles.

In J2EET™, there are two ways to specify access control security: (1) declarative or container security and (2) programmatic or application security. In container security, access control to sensitive resources is defined in an external configuration file, as part of a deployment descriptor. The container then manages the access control to sensitive resources. In application security, access controls are encoded within the application and the application directly manages the access control to sensitive resources. The J2EE™ framework encourages the use of declarative security since it enables greater flexibility by separating security properties from the application logic. Declarative security will illustratively be employed in describing embodiments of the present invention. Further description will follow on systems and methods which employ these aspects and features.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, to illustrate how security roles are defined in J2EE™, an example application of an Observer Pattern 10 is illustratively shown. The Observer Pattern 10 is made of two entities: (1) a subject that includes data of interest (see e.g., ISubject in FIG. 1) and (2) one or more observers (IObserver in FIG. 1) that display the data of interest. The Observer Pattern 10 defines a one-to-many dependency between the subject and the set of observers. Whenever the data in the subject is updated, all the observers that have been registered with the subject for the data are notified of the update.

In J2EE™ the security roles are defined within an assembly descriptor as shown below:

```
<assembly-description>
<security-role>
    <role-name> Manager </role-name>
    <role-name> Notifier </role-name>
    <role-name> Director </role-name>
    <role-name> DisplayId </role-name>
    <role-name> DisplayName </role-name>
  </security-role>
</assembly-description>
```

Once the security roles are defined, the application deployer then associates each role with a set of methods.

Referring to FIG. 2, how roles are defined as a set of method permissions is illustratively shown. As can be seen in FIG. 2, roles may include, e.g., a Notifier, a Manager, a Director, DisplayID and DisplayName. For example, the Notifier role has the permission to invoke the method setData defined in the Subject class.

In J2EE™ roles are typically defined for enterprise Java™ beans (EJB) components rather than arbitrary classes. For simplicity, examples of general Java™ classes will be employed, instead of EJB examples. For the example shown in FIG. 2, a principal with the Notifier role is permitted to access (that is, invoke) the method setData that is defined in the class Subject. Similarly, a principal with the DisplayId role is permitted to access all the methods (denoted by the "*" operator) that are defined in the class ObsId.

In J2EE™ one can use such access control specifications for other Web resources such as access to a HTTP method on a URI (Universal Resource Identifier). Also, methods that are not part of any role, are permitted to be accessed by any principal.

Consider a principal "Mark" who is authorized with the role DisplayId. It may be assumed that an authentication mechanism similar to a J2EE™ authentication mechanism may be employed as in known in the art. Further, assume that Mark invokes a method Driver.main. Since this method is not part of any role, an access control manager does not prevent Mark from executing the method. Now when "Mark" attempts to invoke Subject.addObs (indirectly through Drive.main), a security exception will be thrown since Mark does not have either the Director role or the Manager role. At this point, an application deployer may assign the Director role to Mark so as to avoid an access control exception, which in turn may violate the principle of least privilege. Essentially this means that to associate a role r to a method m, an application deployer has to understand the set of methods S that can be directly or indirectly invoked by m.

Understanding such control flow is not a trivial task, especially by an application deployer. In the J2EE™ security model as known to those skilled in the art, one can also delegate permissions by associating the <run-as> tag to a class C in the deployment descriptor. The effect of such an association is to grant the permission of C to all methods that can be directly or indirectly invoked from C. A careless run-as delegation can introduce some interesting and unforeseen permission problems.

One main problem with role based access control (RBAC) in J2EE™ is that roles are defined for controlling access to methods and not for explicitly controlling access to data. In other words, there is no explicit mechanism for controlling access to data fields and object instances.

Access control to data and objects has to be performed implicitly by giving access to methods which in turn accesses the data. An important security implication of such access control through methods is that information could potentially be leaked through data flow across methods.

Referring again to the example in FIG. 1, using pointer analysis, one can determine that the object referenced in statement 43: is accessed by more than one method (e.g., Subject.notifyObs, Subject.addObs, and ObsId.update). Unless the roles are assigned correctly or consistently among these methods, there could be potential access control and information flow security problems.

Referring again to FIG. 2, the method ObsName.update and the method Obsid.update are part of two different roles. Therefore, when obs.update( ) is invoked at statement 43: the target method could be either ObsId.update or ObsName.update depending on the runtime type of obs. Since, ObsName.update and ObsId.update have two different roles, there could be a potential security problem when the method is dispatched. Therefore, it is important to ensure that both methods are assigned the same role. The security problems that arise are either: (1) too many permissions are given to a principal, which in turn may violate the principle of least privilege, or (2) inadequate permissions are given, which can lead to unnecessary access control exceptions. There can be subtle security violations, such as information tainting and information leakage, when the principle of least privilege is compromised. Note that a simple propagation of roles over the call graph of the program is not sufficient to detect such data flow security problems.

Aspects of the present embodiments focus on data-centric security by introducing two concepts: (1) Role Analysis and (2) Consistency-Based Security and Role Typestates.

(1) Role Analysis: A simple interprocedural static analysis for detecting security problems that may arise when objects are accessed by multiple methods that do not have compatible or consistent assignment of roles to methods is provided. The notion of an object "escaping" a role is presented and a simple interprocedural static analysis for computing the set of objects that may escape a role is described.

(2) Consistency-Based Security and Role Typestates: Method-based role assignments are extended to consistency-based role assignments and roles are assigned to typestates rather than methods. The typestate description of a class is a configuration of its fields, and essentially abstract consistency properties of the fields.

RBAC Models and Program Representation: Static analysis is a process for determining the relevant properties of a program without actually executing the program. A program includes a collection of methods or procedures and is represented using a call graph (CG). A CG G=(N, E) is a directed graph, where N is a set of nodes and E is a set of edges. The set of nodes N is partitioned into two disjoint sets: (1) $N_c$ is a set of call site nodes and (2) $N_m$ is a set of method nodes. The set of edges E is also partitioned into two disjoint sets: (1) $E_{m,c}$ is a set of edges from a method node $x_m$ to each call site node $x_c$ defined in the method, and (2) $E_{c,m}$ is a set of edges from a call site node $x_c$ to each method node $x_m$ that can possibly be invoked from the call site $x_c$. A path is a sequence of edges starting from some node in the call graph. If there is a path from a method node $x_m$ to another method node $y_m$ then the method corresponding to $x_m$ may directly or indirectly invoke the method corresponding to $y_m$.

Referring to FIG. 3, a call graph is illustratively shown for the example program of FIG. 1, where numbers in FIG. 3 correspond to statement numbers in FIG. 1. Pointer analysis includes computing points-to information, represented as a pointer graph, at relevant program points. A pointer graph includes a set of nodes representing compile-time objects and pointer references. For heap allocated objects, pointer p can point-to an object O if p can include the address of O. Typically, the address of O is not known at compile-time and one then assigns compile-time labels to heap objects. There are several different kinds of pointer analyses depending on precision and cost of the analysis. Typically, flow insensitive and context insensitive analysis tends to be cheaper, but less precise than flow sensitive and context sensitive analysis.

Figure 4:
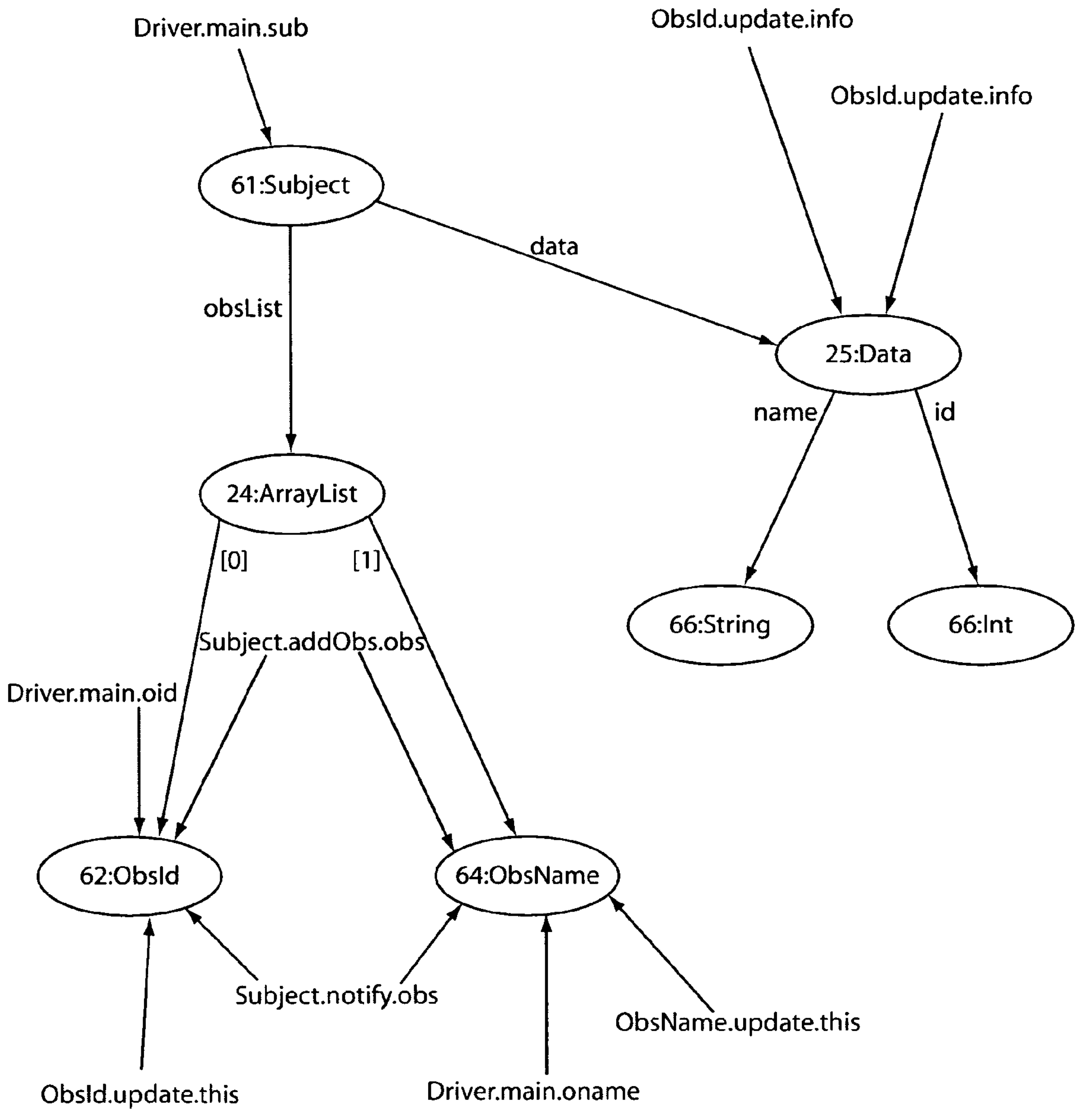
FIG. 4 is an illustrative pointer graph for the program depicted in FIG. 1.

Referring to FIG. 4, a pointer graph is illustrated that is computed using a flow insensitive pointer analysis for the code of FIG. 1, where non-bracketed numbers in FIG. 4 correspond to statement numbers in FIG. 1. The notation $p \rightarrow O$ may be employed to denote that p points-to O. It will also be assumed that objects have fields and each field has a name that can be accessed from the object type or class. Dot-notation is used to access fields, e.g., p.f or O.f, and it can be stated that: $p.f \rightarrow O$ to denote that p points to some object $O_1$ and the field f of $O_1$ points to another object O.

Role Modeling: J2EE™ security is defined in terms of: (1) principals or authenticated users, (2) roles that define named job functions, and (3) permissions that map a role to a set of operations or methods defined in one or more classes. In J2EE™, roles are often defined for Enterprise JavaBeans (EJBs), and for simplicity, herein, Java™ classes will be employed instead of EJBs. For instance, consider the Subject class that includes the methods setData, addObs, removeObs, and notifyObs. A role such as Notifier (see FIG. 2) is given permission to invoke setData. On the other hand, a role such as Director is given permission to invoke all four operations. Notice that a principal with a Director role can invoke any operation that a principal with a Manager role or a Notifier role can invoke. In other words, Director is considered to be "senior" to Manager and Notifier.

Let C denote a set of classes for which RBAC is provided, and let M denote a set of methods in C. A permission Per is a mapping from role r in R to a subset of methods in M. Now, let Per(r) denote the set of method permissions assigned to a role r. For example, Per(Manager)={Subject.addObs, Subject.removeObs}.

Definition [Senior Roles]. Let r and s be any two roles in R. r is a senior role of s, denoted as $r \geq s$, if $Per(r) \supseteq Per(s)$.

Conversely, a junior role may be defined as follows. $r \leq s$, if $Per(r) \subseteq Per(s)$.

Next, a role graph is defined in which nodes represent roles and edges represent the senior (junior) relations. The role graph form employed in this disclosure will include a lattice structure, with $\tau$ representing a role that is the union of all method permissions and $\perp$ representing a role whose permission set is the empty set. A lattice is a partial order with a join and a meet for every pair of nodes. Given any two nodes x and y, the set union of x and y is the join ($\sqcup$), and the set intersection of x and y is the meet ($\sqcap$).

Now let $Per_i(r)$ be a set of method permission that is initially assigned a role r (as specified in the deployment descriptor). In J2EE™ a method permission can be assigned to more than one role. Let $Role_i(m)$ denote the set of roles that an application deployer initially assigns to m. In other words, $Role_i(m)=\{r \mid m \in Per_i(r)\}$. For example, $Role_i$(Subject.setData)={Notifier, Director}. If a method is not explicitly assigned to any role, then it can be accessed by any principal. Note that one can also use the "*" to indicate all the methods in a class as belonging to a specific role.

Role Analysis: Two illustrative role analyses are presented and include: (1) role consistency analysis for computing consistent role assignment and (2) role escape analysis for computing the set of objects that may escape a role.

Role Consistency Analysis: Let r be a role assigned to m (by an application deployer), and let m' be a method that can be invoked directly or indirectly from m. A principal who is assigned the role r should also have permission to invoke the method m', i.e., m' should also be in Per(r). Often an application deployer handles only entry methods of an application or a component. These entry methods are essentially the application programming interface (API) of the application. In the case of a Java™ application, the entry methods are the set of public and protected methods defined in interfaces and classes. Therefore, an application deployer has the capability to define permission sets and assign roles based on the entry methods defined in an API.

Let A be an application, let $M_e$ be a set of entry methods to A (as defined in its API), and R be the set of roles defined using the entry methods.

Figure 5:
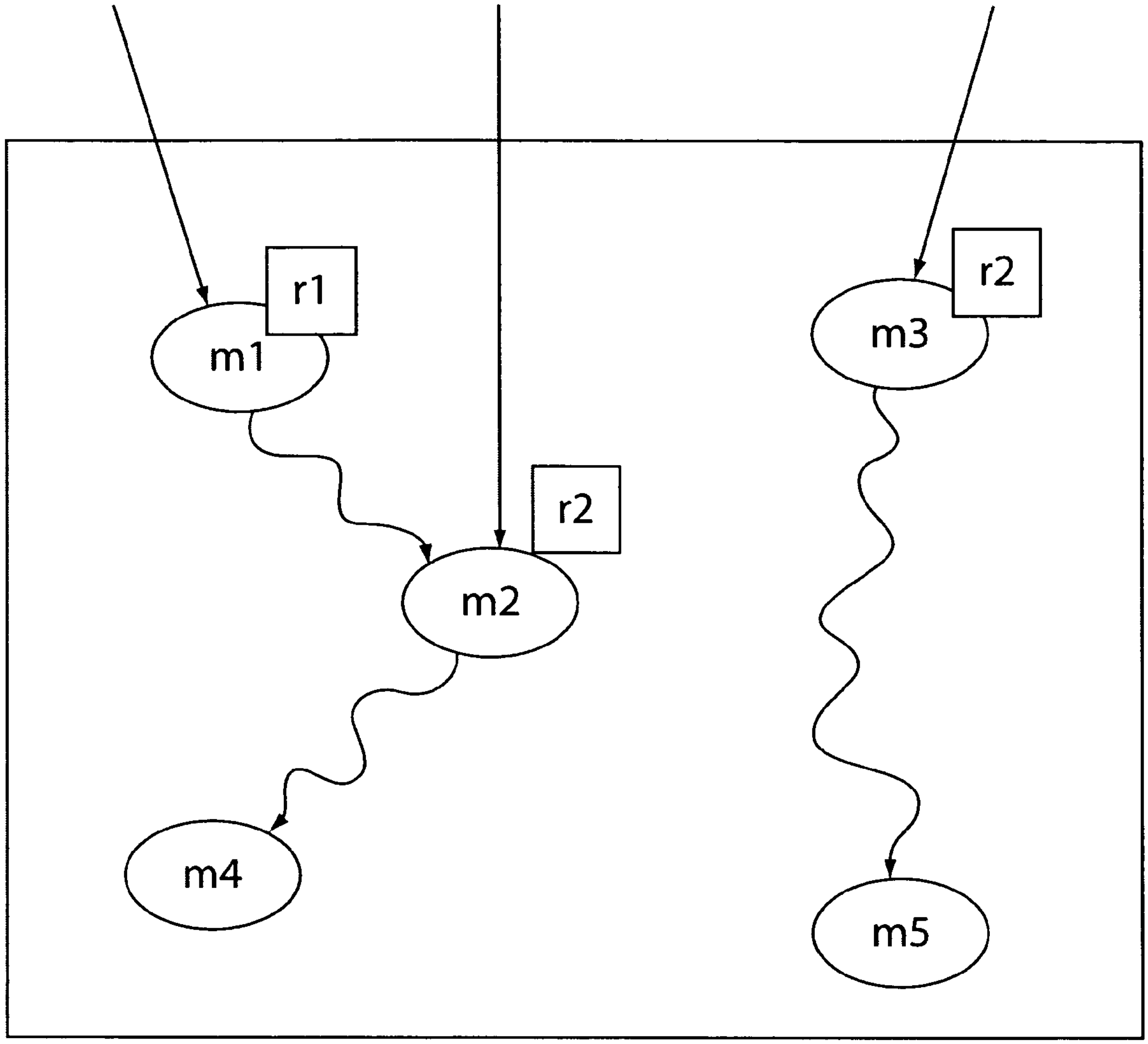
FIG. 5 is an application model showing entry methods and role assignments in accordance with an illustrative example.

Referring to FIG. 5, an application or component model is illustratively shown. Notice that an entry method such as m1 can directly or indirectly invoke another entry method m2. One question is how to define consistent roles and permission sets that are based on only the entry methods of an application. Consider an entry method $m1 \in M_e$ and let $r_1 \in R$. Now, define $r_1$ to include m1 in its permission set, that is $m1 \in Per(r_1)$, and therefore $r_1 \in Role(m1)$. What this essentially means is that if a principal P is assigned the $r_1$, then P has the permission to invoke m1. Now let m2 be some other method reachable from m1, and so P should also have the permission to invoke m2. Let $Per(r_2)=\{m2, m3\}$, and so m2∈$Role(r_2)$. $r_1$ and $r_2$ should be ensured to have a consistent permission set.

There are two cases to consider: (1) m2 is not in $Per(r_1)$, and in this case P should also be assigned the role $r_2$ so as to avoid access control exception. On one hand, by assigning $r_2$ to P, also give P the permission to access m3, which violates the principle of least privilege. On the other hand, m3 may be in a different sub-component, in which case separating the roles makes sense in some situations, even if the principle of least privilege is violated. (2) m2 is in $Per(r_1)$, and in this case the assignment is consistent.

One way to compute consistent role assignment is to first determine the set of methods that are reachable from an entry point in the call graph of the program. Let L be the set of methods that are reachable from an entry point $m \in M_e$ in the call graph. Let $L'_m = L \cap M_e$, and so $L'_m$ is a set of methods that are reachable from m and the set of methods are also entry methods. Now let r be a role with $m \in Per(r)$. Since a method $l' \in L'_m$ is also reachable from m, ensure that $l' \in Per(r)$. So rather than defining arbitrary roles and permission set, a deployer first computes $L'_m$ for each entry method m. The deployer can then define roles based on the entry method m and $L'_m$ by ensuring that $L'_m \subseteq Role(m)$.

Applications may be composed of many components and the components are assigned with consistent roles. Consider the example shown in FIG. 1 and the role assignment shown in FIG. 2. Let $Role_i$ denote the initial set of role assignments. In order for a principal to invoke Subject.setData the principal not only needs the Notifier, but also DisplayId and DisplayName roles.

Figure 6:
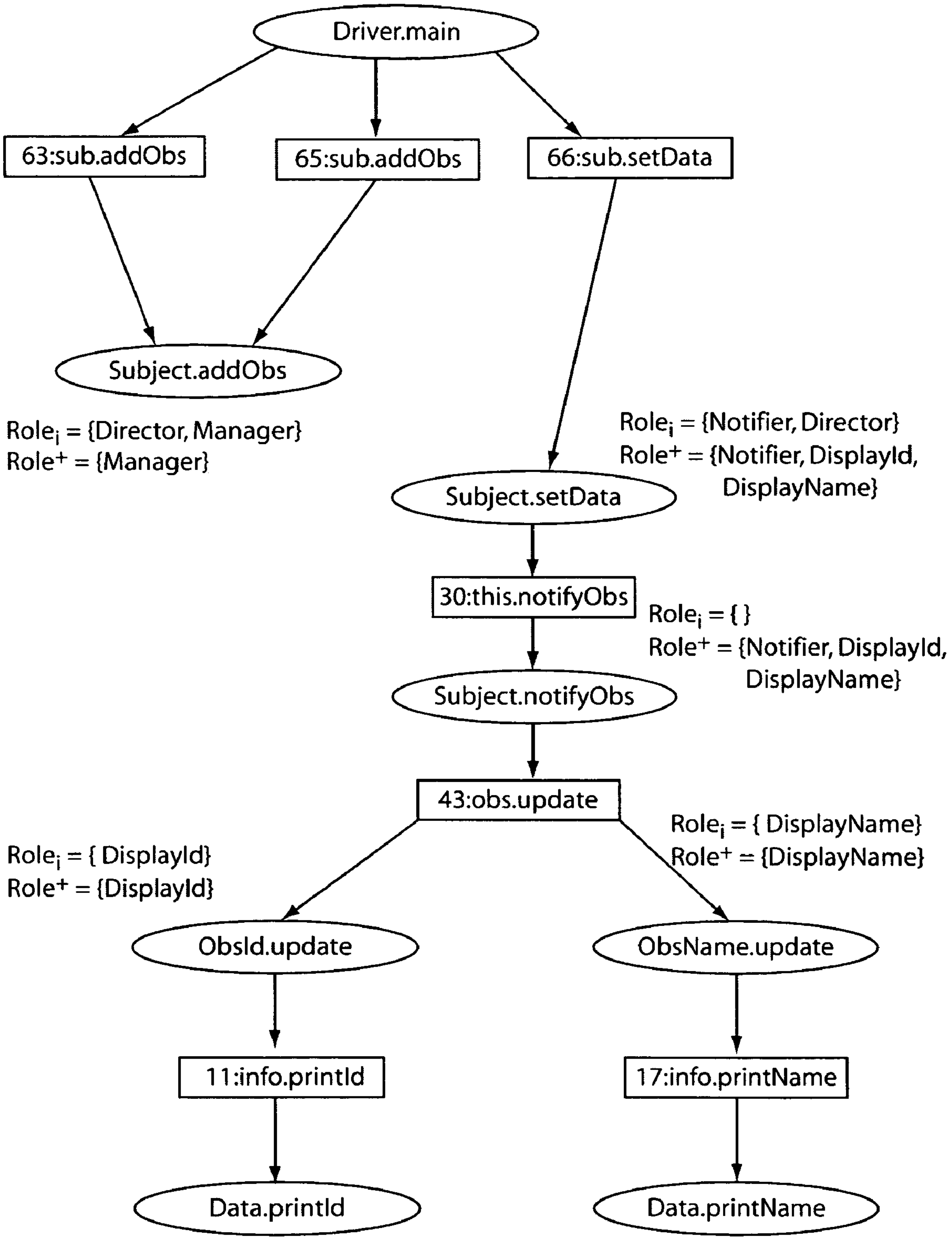
FIG. 6 is an annotated call graph showing $Role_i$ and $Role^+$ role assignments for each method in accordance with one illustrative embodiment.

Referring to FIG. 6, an annotated call graph is illustratively shown with $Role_i$ and $Role^+$, which are the initial role assignments and the minimum roles needed to invoke the methods. Computing $Role^+$ for each method is a straightforward backward propagation of roles over the call graph and at each step only propagation of junior roles up the call graph is performed. That is, a lattice join is performed at each step and the joined role information is propagated.

The role analysis described previously is preferably based on reachability over a call graph of a program. Although role propagation over the call graph may be important in preventing certain kinds of access control problems, it does not detect access problems that could happen due to data flow across methods. A limitation of the J2EE™ security model is that it focuses on securing the mechanism (that is, methods) that access sensitive information or resources. For instance, J2EE™ does not allow one to specify roles for class fields and class instances. Subtle problems may arise due to data flow across methods. For example, the receiver expression (such as 43: obs.update(data) in FIG. 1 can target more than one method. Programmers have to make sure that the roles assigned to the target method are consistent with the role assigned to a method that invokes the object.

Also, an object is often accessed by multiple methods that have different roles assigned to them. Consider the points-to graph shown in FIG. 4, and, in particular, the object 62:ObsId. This object is directly accessed by the methods Driver.main (which created the object), ObsId.update (via the "this" parameter), and Subject.notifyObs. Now, consider the role assignment and method permission shown in FIG. 6. The method ObsId.update is assigned only to role Display. Unfortunately, since the object, 62:ObsId, is also accessed by other methods, there can be inconsistencies among roles assigned to different methods that access the same object. This can lead to information leakage.

Given the pointer graph of a program, for each object, the set of methods are computed that directly access the object. Call the resulting graph a method-annotated pointer graph (MAPG). It is straightforward to compute this information if fully qualified names are used for reference. Consider the pointer graph shown in FIG. 4 and the object 62:ObsId. The set of methods that access this object can be read off from the pointer graph, which is Driver.main, Subject.addobs, Subject.notify, and Obsid.update. Since any of these methods have the "capability" to access the object, the object is assigned a role that is the least upper bound of the roles assigned to these methods. Now a principal who wants to access the object referenced by 62:ObsId should have a role that is at least equal to the least upper bound of the roles assigned to the methods that access the object. Unfortunately, in J2EE™, it is not possible to assign roles to objects or class instances.

Role Escape Analysis: The concept of role escape analysis will now be described in accordance with present principles. Escape analysis is a procedure for determining the set of objects that escape the life time of a method or a thread. Consider the following simple example:

```
1: void foo( ) {
2:   LinkedList head = new LinkedList( ) ;
3:   bar(head) ;
4:   }
5: void bar(LinkedList h){
6:   LinkedList n = new LinkedList( ) ;
7:   n.next = null ;
8:   h.next = n ;
9: }
```

The object 6:bar.LinkedList created at 6: escapes the method bar because there is an access path to the object from the parameter reference h. On the other hand, the object 2:foo.LinkedList created at 2: and the object 6:bar.LinkedList created at 6: do not escape foo. One simple way to compute whether an object O escapes a method M is first to construct the pointer graph and then check if there is a path to O in the graph that can be reached by some node O' that is accessed in some other method M' and the life time of M' that exceeds the life time of M.

In role escape analysis, the method escape analysis may be extended as follows. An object O role escapes a method M with role R if there is a path in the pointer graph from some node O' that is accessed in some other method M' with role R' and R κ R'. Conversely, an object O is role confined to a M if O does not role escape M. A definition of role escape employed herein is more general than the traditional method or thread escape, whereby method lifetime is defined herein as a role. The role escape analysis essentially includes determining if a node p in the pointer graph that is annotated with method m and role $r \in Role^+(m)$ is reachable from another node p' that is annotated with m' and role $r' \in Role^+(m')$ and rκr'.

Notice that the converse of role escape, which is role confinement, of an object is closely related to information flow security. Since roles are modeled using a lattice structure, if an object O does not escape a role R then the object cannot leak information outside the role. Also, if an object escapes a role, the object can become "tainted" by an external principal with access to the object.

Consistency-Based Security: It is often the case that an application developer has a better understanding of the application that he or she is developing than an application deployer or the system administrator. On the other hand an application deployer has a better understanding of the application deployment environment than an application developer. One idea behind consistency-based security (CBS) is to focus on the consistency properties of data and methods. An application developer simply identifies and defines the consistency properties as code annotation. A simple consistency property could be that two fields of a Java™ class are modified by the same set of methods. Another consistency property is the typestate property, which is often used to specify ordering of methods in an application. In CBS, a tool can scan the code and present the developer's consistency properties to an application deployer. An application deployer can then use the consistency properties as a guide for associating security properties to roles, and then grant authorization to users.

Data Consistency Security: a simple consistency property in which two or more fields of an object are all accessed by the same set of methods. Given this property, an application deployer can then associate the same role for all methods that access these fields. Consider a simple employee record in a company.

Employee Record:

```
enum EmpType = {RSM, Manager, SoftEng, Staff} ;
class Employee {
    String fname ;      // first name
    String lname ;      // last name ;
    int id ;            // company identity number
    int ssn ;           // social security number
    String gender ;
    String ethnic ;     // ethnicity
    EmpType etype ;
}
```

Suppose an application developer is developing a business application, such as a payroll application, and decides that gender, and ethnicity ("ethnic") have the same "consistency property. A simple example of a consistency property is that the two fields are always accessed by the same set of methods. Another example of a consistency property is access rights; if a user is permitted to access one of the two data fields, then the user is automatically allowed to access the other data field. Yet another example of a consistency property is encryption; the values of the two data fields should use the same encryption/decryption keys. An application developer usually has a better understanding of the consistency properties than the application deployer. For instance, if gender, and ethnic are always accessed by the same set of methods, the developer can then define a simple consistency property classification called race.

Consistency Property Classification—Race:

```
class Employee {
    access(name, idy)  String fname ;
    access(name, idy)  String lname ;
    access(idy)        int id ;
    access(idy)        int ssn ;
    access(race) String gender ;
    access(race) String ethnic ;
}
```

Often a field (or a method) can belong to more than one class of a consistency property. For instance, fname (first name) and lname (last name) belong to two different classes of the access property. A consistency property includes two parts: (1) a property name such as access and (2) a set of classifications, such as name, idy, and race. Given the consistency properties defined by an application developer, a natural question to ask is how will the application deployer use them. An application deployer first queries the application for all application-defined properties. Next, the application deployer associates roles to consistency properties. Suppose an application deployer defines two roles called Manager and NonManager, and associates the Manager role with access (name,idy,race) and NonManager role with access(name). With this association, a Manager can access all the defined fields, whereas a NonManager can only access the fields fname and lname. Notice that a deployer does not need to understand how a developer defined the consistency properties. The deployer only has to know what set of consistency properties have been defined by the developer.

Role Typestates: RBAC's are defined by focusing on the typestate consistency property. The approach that may be employed is very simple: an application developer defines the typestate properties and an application deployer then assigns roles based on the typestate properties. Typestates provide much richer information than simple method interfaces to an application deployer.

The concept of a typestate may be understood as an extension to the notion of a type by providing that a variable be in a certain state before operations on the variable can be performed. In other words, certain preconditions have to be met prior to performing any operation on a variable. Typestate is useful for tracking certain kinds of flow-sensitive errors or bugs, such as uninitialized variables. For object-oriented (00) programs, the typestate of an object (that is, an instance of a class) is a description or a configuration of all its fields. In OO programs, a method that is invoked on an object o typically has a partial view of the object o. One can use typestates to define a consistent view of an object prior to an invocation of a method on the object. Consider a simple file object that includes two typestates Open and Close.

File Object with Two Typestates:

```
 class File {
typestate = Start, Open, Close
// @requires Start
File create(String fname) ; // create file
// @requires Close
void open( ) //
// @requires Open
String read( ) ; // returns the content of file
// @requires Open
void write(String data) ; // write to file
// requires Open
void close( ) ; // close the file
}
```

Figure 7:
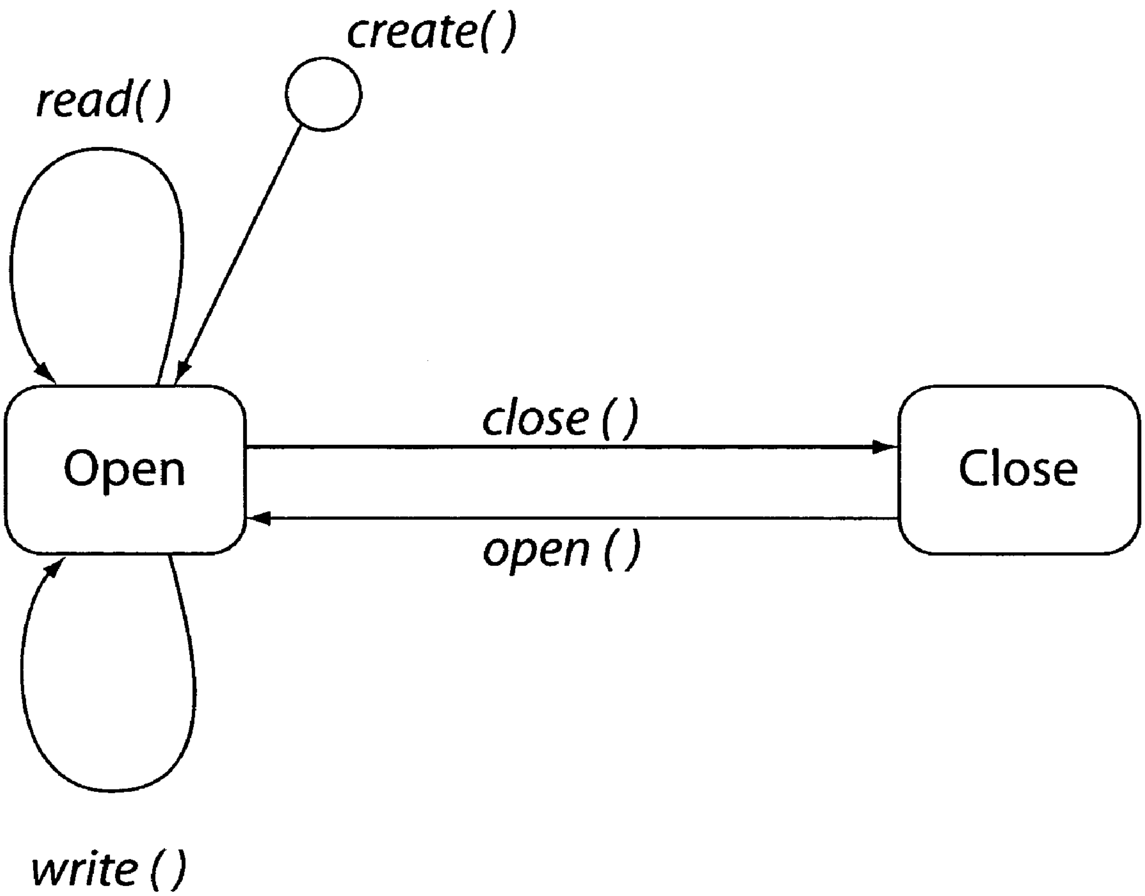
FIG. 7 is a typestate diagram for a File program operation in accordance with an illustrative example.

Referring to FIG. 7, a typestate diagram is a finite state diagram, with nodes denoting the typestates of a class (e.g., open and close) and a labeled edges denoting transitions between typestates of a class. The labels on the edges (e.g., close( ), open( ), create( ), read( ), write( ) ) correspond to (a subset of) methods defined in the class. The source and destination nodes of a transition correspond to pre- and post-conditions of the method that labels the transition, respectively. An execution of a method takes an instance of a class from one typestate to another typestate. FIG. 7 illustrates a typestate diagram for the File class code (FILE OBJECT WITH TWO TYPESTATES) presented earlier. The typestate diagram specifies the life-cycle of how an instance of the File class goes between Open and Close typestates. A method, such as open( ), is executed only when its pre-condition typestate of the File object is Close, and after the execution the new typestate of the object is Open. Both read( ) and write( ) methods can execute only when the File object is in Open state.

The typestate diagram is an external specification of a class. It prescribes the order in which a client can invoke various methods defined in the class. Generally, only an application developer understands the lifecycle of an object. Given such a specification, an application deployer can now associate security properties to typestates. For instance, an application deployer can associate Manager role to Start, Open and Close typestates, and Engineer role to Open. What this essentially means is that only a Manager is permitted to execute all methods of the class, whereas an Engineer is permitted to execute only read( ) and write( ) methods.

Figure 8:
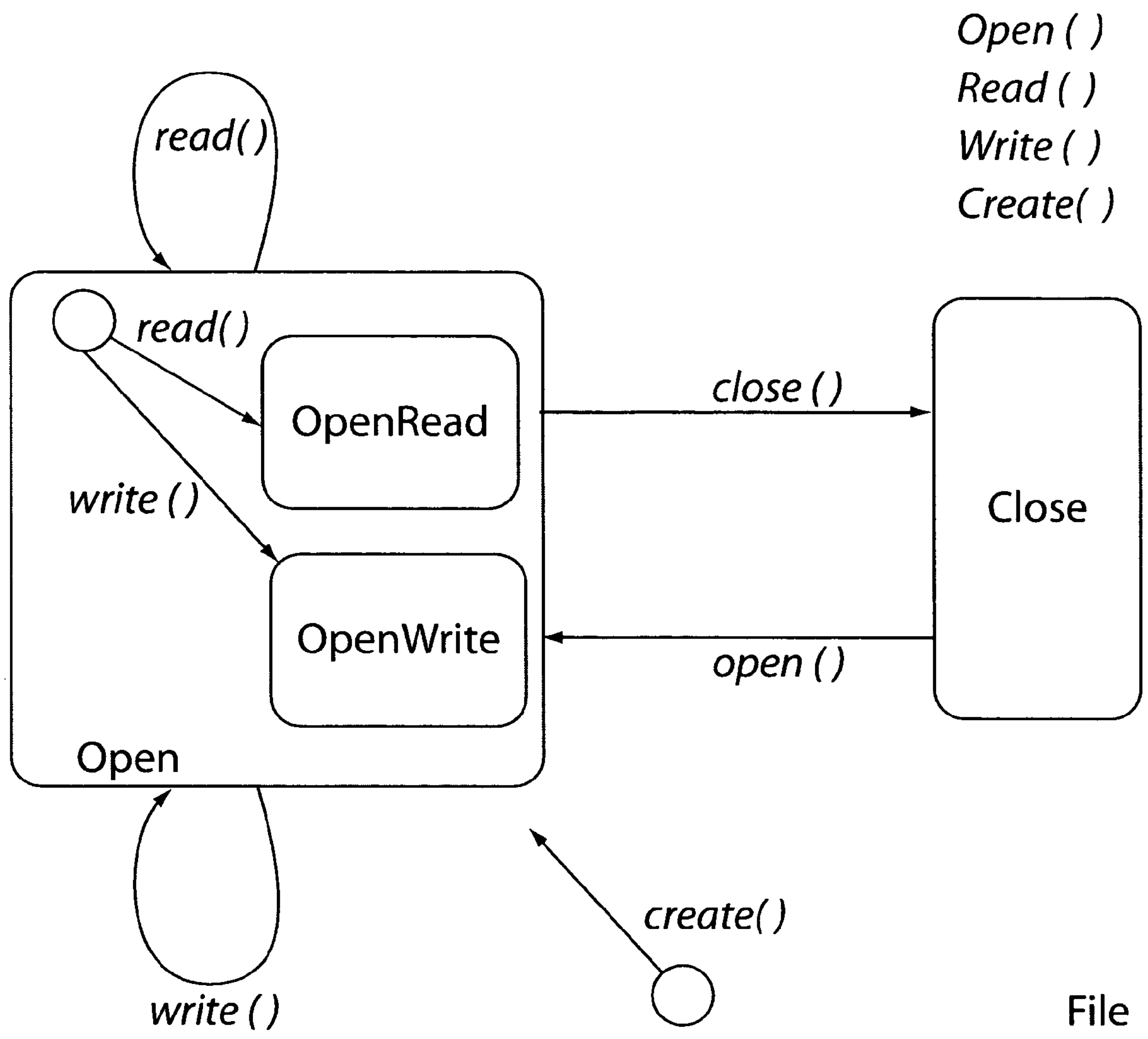
FIG. 8 is a hierarchical typestate diagram for the diagram of FIG. 7.

In accordance with present principles, a typestate diagram may be partitioned into a hierarchical structure and use the notion of a hierarchical typestate diagram. A hierarchical typestate diagram includes a set of states and a set of transitions. A state may be composed of other states, called sub-states. This enables modeling of a complex hierarchical typestate diagram by abstracting away detailed behavior into multiple levels. States that do not include sub-states are called simple states, whereas states that have sub-states are called composite states. States may be nested to any level. A transition relates two states: a source state and a destination state. Transitions are labeled and each label corresponds to a method invocation. An invocation of a method can cause a state transition. The hierarchical states in a typestate diagram may induce a tree structure. FIG. 8 illustrates a hierarchical typestate diagram in which the Open state shown in FIG. 7 has been expanded. For role typestates, it is natural to model roles using a tree structure.

Figure 9:
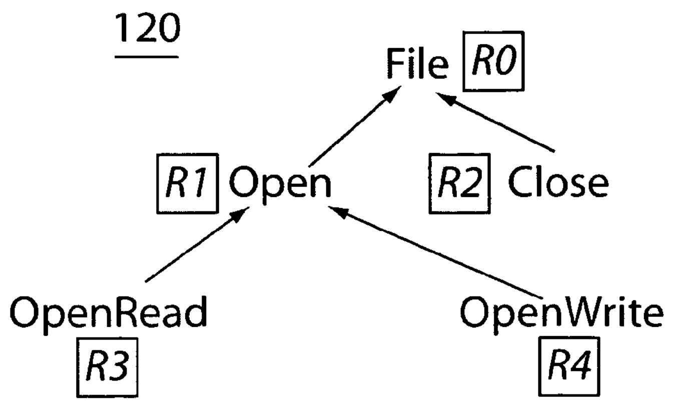
FIG. 9 is a diagram showing a role hierarchy assignment in accordance with an illustrative embodiment.

Referring to FIG. 9, a tree structure 120 having role assignments models is illustratively shown. Roles R0-R4 are assigned to each method in the tree. The definition of senior relation is simpler: $r \bar{>} s$ if r is a parent of s in the role hierarchy tree 120. Roles are assigned to hierarchical states in the typestate diagram. If s is assigned the role r then the Per(r)={t|t∈Root(s)}, where Root(s) is a set of all states in the sub-tree that is rooted at s in the typestate hierarchy tree 120.

Consider the role assignment shown in FIG. 9, and the permission set for each role includes:

Per(R0)={File,Open,Close,OpenRead,OpenWrite},
Per(R1)={Open,OpenRead,OpenWrite},
Per(R2)={Close},
Per(R3)={OpenRead}, and
Per(R4)={OpenWrite}.

If a principal P is assigned the role R1 then P can invoke both read and write, but cannot invoke close. Now if P is assigned R3 then P can only invoke the read method.

Consider a method such as File.close( ) and a principal P who is assigned the role R1. The principal P should not be allowed to invoke File.close( ) even if the current typestate of the object referenced by the principal is Open. This is because, the method File.close( ) creates a state transition from Open to Close and P is not allowed to be in state Close. So only principals with role File are essentially permitted to execute File.close( ).

Given a set of roles assigned to typestates, the roles needed for methods can easily be computed as the least common ancestor of the roles assigned to the pre- and post-state of the method. Note that when a File object is passed around to different methods that are accessed by different principals, we only have to ensure that roles are consistent on the current typestate of the object and do not have to worry about the methods themselves.

Typestates are useful for modeling access patterns, including message patterns in, e.g., Web Services. Once such message patterns are modeled using typestates, roles can be assigned to states using the present principles and provide security for applications, e.g., Web Service applications.

The present embodiments address the challenges of role assignment and role semantics in building applications. The prior art method-based access control is limiting in terms of its expressive power. In accordance with one embodiment, a data-centric security is employed to complement the method-based security. Role-based access control for managing and controlling access to sensitive resources is provided. RBAC models have become popular because of their generality in expressing a diverse set of access control policies. Security analysis techniques are provided for ensuring that security properties are correctly maintained even in the presence of delegating administrative privileges.

A simpler lattice structure for modeling roles is also employed. The notion of role escape analysis is introduced to specially address the need for data-centric security. Also presented is consistency-based security, along with role typestates for specifying access control security.

The role analysis described herein is related to static analysis. The consistency-based security and role typestate is one preferred way to extend the J2EE™ model to deal with data-centric security.

Java 2 Standard Edition™ (J2SE™) provides security mechanisms for protecting resources (e.g., the file system) in terms of run-time stack inspection. The security access control model is based on properties that include code origin and principal's execution environment. The present disclosure follows program analysis techniques for RBAC, uses typestate properties for RBAC, and introduces the notion of role escape analysis and the notion of role typestates to model and detect security problems, e.g., in J2EE™.

In accordance with present principles, role escape analysis generalizes the traditional escape analysis, where the method and thread lifetime are considered to be an instance of roles. Role escape analysis is useful for detecting confinement properties of objects, and for detecting information leaks through objects.

Role typestates combine the notion of roles and typestates. By associating roles to typestates, a more general model is defined for specifying roles; instead of specifying roles on methods, the role are now specified on typestates.

The present disclosure describes some of the security issues related to J2EE™ RBAC model, illustrated several examples that show the limitation of method-based role assignment, and discussed the concepts that bring out a data-centric security model. Consistency based security that includes typestate security may be employed to complement method-based security. In other words, the present principles may be employed in addition to or instead of the security measures employed in the prior art environments.

Figure 10:
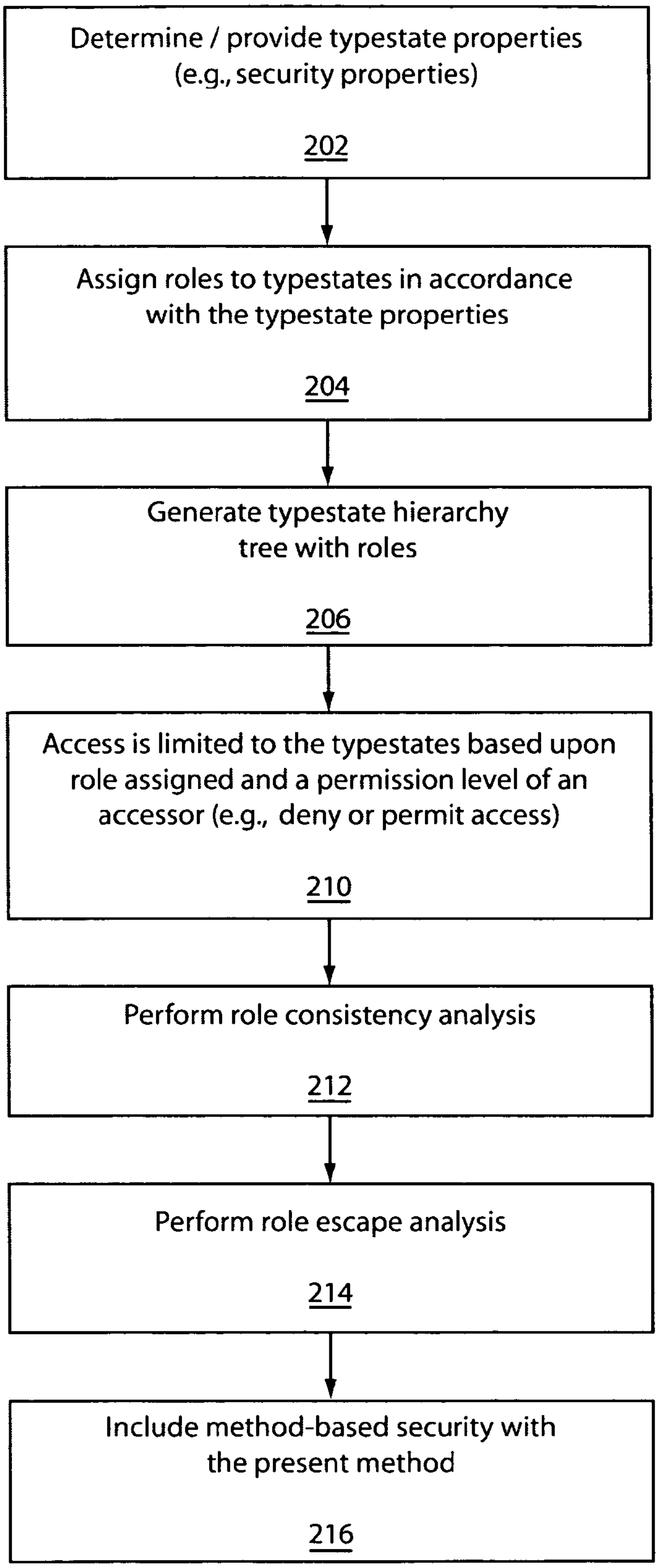
FIG. 10 is a block/flow diagram showing a system/method for access control using typestate role assignments in accordance with one embodiment.

Referring to FIG. 10, a block/flow diagram showing a system/method for providing access control using roles is illustratively depicted. In block 202, for at least one typestate, typestate properties are determined or provided. In one example, typestate properties include an association of a security property (or level) with the typestate to assign the role to the typestate.

In block 204, a role is assigned to the at least one typestate in a program in accordance with the typestate properties. In block 206, a typestate hierarchy tree may be generated and roles are assigned to nodes of the hierarchy tree where the nodes represent the typestates.

In block 210, access to operations of the at least one typestate in the program are limited based on the role assigned to the at least one typestate and an access permission level. Limiting access may include denying access to the at least one typestate if a role is junior to an assigned role and/or permitting access to the at least one typestate if a role is senior to an assigned role.

In block 212, a role consistency analysis may be performed to determine if assigning the role is consistent throughout the program. In block 214, a role escape analysis may be performed to determine if any program objects escape a role assignment. In block 216, a method-based access control method may be employed instead of or in addition to the present method for access control.

Figure 11:
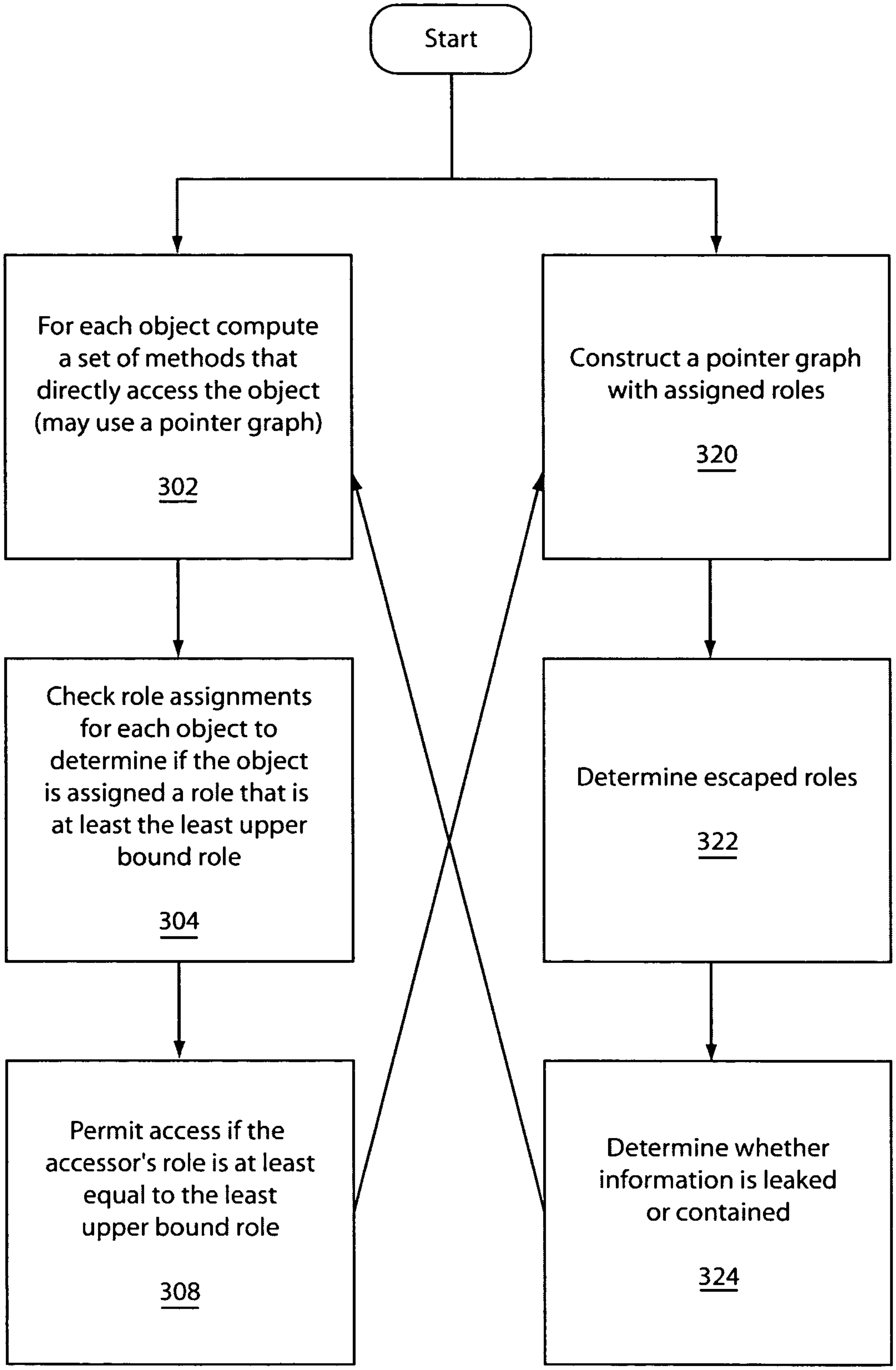
FIG. 11 is a block/flow diagram showing a system/method for analyzing role consistency for program access control in accordance with illustrative embodiments.

Referring to FIG. 11, a block/flow diagram showing a system/method for analyzing role consistency for program access control is illustratively depicted. In block 302, for each object in a program having a plurality of objects, a set of methods that directly access an object is computed. This may include generating a pointer graph of the program, such as, a method-annotated pointer graph.

A role assignment is checked for each object by determining if the object's role is a least upper bound of the roles assigned to the methods of the set in block 304. Access is permitted to the set of methods if an accessor's role is at least equal to the least upper bound of the roles assigned to the methods that access the object in block 308.

A role escape analysis (blocks 320-324) may be performed instead of or in addition to the role consistency analysis (blocks 302-308) to determine if any program objects escape a role assignment. The role escape analysis includes constructing a pointer graph for a program having a plurality of objects having assigned roles in block 320. In block 322, each object O is checked to determine if O role escapes a role R by determining if there exists another path to that object O in the pointer graph that can be reached by some node O' that is accessed in another role R' and a lifetime of the method R' exceeds the life time of R. In block 324, it is determined whether information is leaked or contained based upon role escaped objects or lack thereof. The role consistency analysis may be performed separately or in addition to the role escape analysis.

Figure 12:
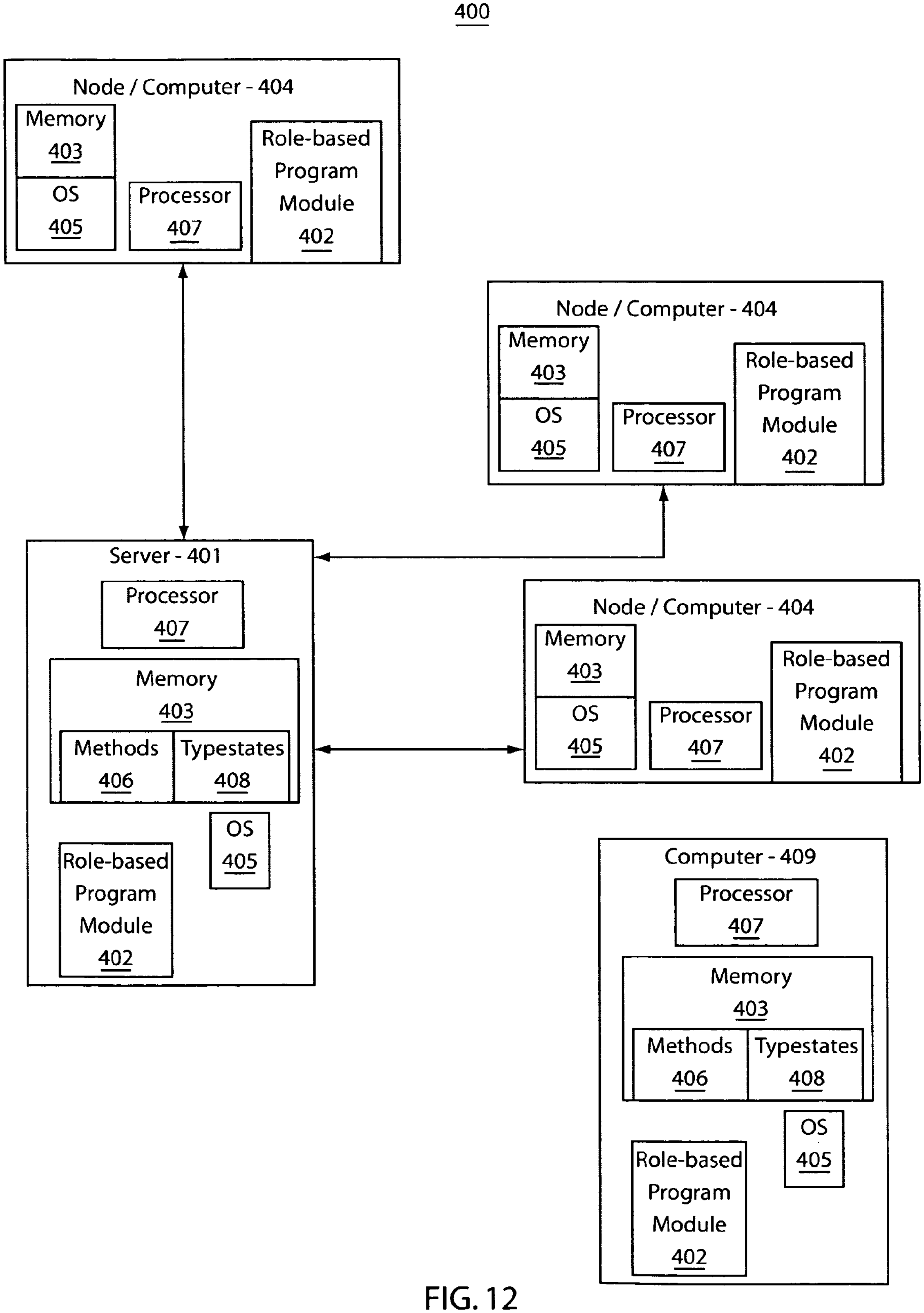
FIG. 12 is a block diagram showing an illustrative system for employing role based analysis and access control in accordance with an illustrative embodiment.

Referring to FIG. 12, an illustrative system 400 includes a program access control program or module 402 capable of supporting role-based security and role-based security compliance in accordance with the present principles. Program 402 is preferably incorporated into the operating system of computers, nodes and servers where access control is needed. In one embodiment, each operating system for all devices employed in the system 400 employs the role-based system of the present invention. System 400 may include a private computer network, a single computer (409) or a public computer network, such as the Internet or any combination of these. In addition, the role-based access control may be employed in telephones (cell phones), handheld or laptop computers (e.g., PDAs), or any other computing device or system.

Server 401, computer 409 and each computer or node 404 in the network may include memory storage 403 (e.g., RAM) where an operating system 405 in conjunction with a processor 407 and communication protocols are employed to facilitate communications between network or computer users and perform the action needed for access control in accordance with present principles. Nodes or computers 404 may include access points for a plurality of users to a server 401 or may include individual computers which grant or deny permission to gain access to methods 406 and/or typestates 408 stored on a computer or server 401. Although methods 406 and typestates 408 are shown in the server 401 and computer 409, any or all computers 404 in the network or independent computers 409 may include methods and typestates that are under access control. The methods and typestates include roles such that a principal attempting to access the method and/or the typestate can gain access to the method or typestate only if the proper permission or access level in afforded to that principal. By employing typestates and other principles disclosed herein, method-based access control is extended by moving to a more data-centric access control system.

Program 402 may be distributed over the network or located on a server; however, program or module 402 is preferably included in the operating system of individual computers or servers. Program 402 further includes features to provide for role assignment, check for role consistency and determine whether any roles assigned can be escaped as described above in accordance with present principles.

Having described preferred embodiments of a system and method for role based analysis and access control (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for program access control, comprising:

generating a typestate hierarchy tree and assigning roles to nodes of the hierarchy tree wherein the nodes represent typestates;

for at least one typestate, providing typestate properties;

assigning a role to the at least one typestate in a program in accordance with the typestate properties by associating a security property with the typestate;

limiting access to operations of the at least one typestate in the program based on the role assigned to the at least one typestate and an access permission level;

performing a role consistency analysis to determine if assigning the role is consistent throughout the program; and performing a role escape analysis to determine if any program objects escape a role assignment.

2. The method as recited in claim 1, wherein limiting access to operations includes denying access to the at least one typestate if a role is junior to an assigned role.

3. The method as recited in claim 1, wherein limiting access to operations includes permitting access to the at least one typestate if a role is senior to an assigned role.

4. The method as recited in claim 1, wherein the method is included with and extends a method-based access control method.

5. A computer program product comprising a computer useable storage medium having a computer readable program for program access control, wherein the computer readable program when executed on a computer causes the computer to perform the steps of:

for at least one typestate, providing typestate properties;

assigning a role to the at least one typestate in a program in accordance with the typestate properties; and limiting access to operations of the at least one typestate in the program based on the role assigned to the at least one typestate and an access permission level; and performing a role escape analysis to determine if any program objects escape a role assignment.

6. The computer program product as recited in claim 5, further comprising performing a role consistency analysis to determine if assigning the role is consistent throughout the program.

7. The computer program product as recited in claim 5, wherein limiting access to operations includes at least one of denying access to the at least one typestate if a role is junior to an assigned role and permitting access to the at least one typestate if a role is senior to an assigned role.

* * * * *